(12) United States Patent
Crippa et al.

(10) Patent No.: US 8,794,397 B2
(45) Date of Patent: Aug. 5, 2014

(54) PAD FOR DISC BRAKES

(75) Inventors: Cristian Crippa, Bergamo (IT); Antonio Tupputi, Bergamo (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 1222 days.

(21) Appl. No.: 12/666,713

(22) PCT Filed: Jun. 27, 2007

(86) PCT No.: PCT/IT2007/000458
§ 371 (c)(1),
(2), (4) Date: Apr. 7, 2011

(87) PCT Pub. No.: WO2009/001381
PCT Pub. Date: Dec. 31, 2008

(65) Prior Publication Data
US 2012/0024643 A1      Feb. 2, 2012

(51) Int. Cl.
*F16D 65/38* (2006.01)
(52) U.S. Cl.
USPC .................. 188/73.37; 188/250 B; 188/250 E
(58) Field of Classification Search
USPC ........ 188/378, 379, 380, 73.31, 73.35, 73.36, 188/73.37, 251 R, 252, 255, 257, 258, 188/250 B, 250 E, 250 F, 250 G
See application file for complete search history.

(56) References Cited

U.S. PATENT DOCUMENTS

| | | | | |
|---|---|---|---|---|
| 5,099,961 A * | 3/1992 | Dreilich et al. | ............ | 188/73.35 |
| 5,515,952 A * | 5/1996 | Jackson | .................... | 188/250 E |
| 5,746,292 A * | 5/1998 | Tanaka et al. | ............. | 188/73.37 |
| 5,887,686 A * | 3/1999 | Tanaka et al. | ............. | 188/250 E |
| 6,283,258 B1 * | 9/2001 | Chen et al. | ................ | 188/250 E |
| 6,340,076 B1 * | 1/2002 | Tsuchiya | ................... | 188/73.45 |
| 6,994,190 B1 | 2/2006 | Gotti et al. | | |
| 7,032,723 B2 * | 4/2006 | Quaglia et al. | ............. | 188/73.37 |
| 7,316,301 B2 * | 1/2008 | Roberts | ...................... | 188/250 B |
| 8,342,297 B2 * | 1/2013 | Chern et al. | ............... | 188/73.37 |
| 2004/0074712 A1 * | 4/2004 | Quaglia et al. | ............. | 188/73.35 |
| 2004/0134725 A1 * | 7/2004 | Bosco et al. | ................ | 188/73.37 |
| 2006/0096814 A1 * | 5/2006 | Hoffrichter et al. | ....... | 188/73.37 |
| 2006/0266599 A1 * | 11/2006 | Denys et al. | ................ | 188/73.37 |
| 2007/0045063 A1 * | 3/2007 | Naito et al. | ................ | 188/73.37 |

FOREIGN PATENT DOCUMENTS

| | | |
|---|---|---|
| DE | 19920079 | 11/2000 |
| DE | 102006039886 | 3/2007 |
| FR | 2577639 A1 * | 8/1986 .............. F16D 69/04 |

OTHER PUBLICATIONS

Machine translation of FR 2577639.*

* cited by examiner

*Primary Examiner* — Bradley King
*Assistant Examiner* — Nicholas J Lane
(74) *Attorney, Agent, or Firm* — Shoemaker and Mattare

(57) ABSTRACT

A pad (20) for disc brakes comprises a plate (22) acting as the support for a friction material layer (24). The plate (22) extends past the friction material layer (24) at least at a radially outer portion (E) of the pad. At least one load (30*a*, 30*b*) is applied to the plate (22) and fixed thereto by means of clinching. This load changes the mass of at least one portion of the plate such as to obtain an inertia of the pad which substantially avoids the vibrations of the pad during the braking action which are suitable to cause noisiness of the disc brake. The load (30*a*, 30*b*) comprises at least one projection (32) suitable to be clinched to fix the load to the plate. The projection (32) is inserted within a hole (34) of the plate and clinched.

18 Claims, 5 Drawing Sheets

PAD FOR DISC BRAKES

FIELD OF THE INVENTION

The present invention relates to pads for disc brakes.

Generally, the braking action in a disc brake is produced by such means as for example, cylinder-piston units, which act by means of pads on opposite surfaces of a rotating disc.

BACKGROUND OF THE INVENTION

As is known, during this braking action, a noise is often generated which reveals itself as a particularly irritating hiss, which reduces the travel comfort.

The generation of this kind of noise is ascribed to the onset of vibratory effects which involve the various brake components, among which there are also the pads.

Intensive research has been conducted aiming at providing techniques which allow reducing or eliminating noisiness during braking.

One of these techniques suggests to connect a load, by means of a resilient body, to a disc brake component that may be involved in the vibration. According to this technique, any vibration of this brake component is transmitted to the load, which, at low frequencies, oscillates in phase with the component to which it is connected. As the vibration frequency increases, the shift of the oscillations of the load and brake component will increase to a phase opposition condition, at which the component vibration is either reduced or eliminated. Furthermore, according to this technique, the load can be alternatively applied to the piston, caliper body or pad.

This technique requires for the entire brake structure to be specifically designed.

This design is required in order to provide a suitable resilient intermediate element to be arranged between the brake component of which the oscillations are to be reduced, and a suitable load, and also to provide a seat within which the load can oscillate thereby deforming the resilient body.

The requirement of changing the brake structure thus dramatically in order to reduce the hiss effect is a serious drawback. In fact, due to the complexity of the effects occurring during a braking action, and since they depend on a particular application, i.e. the type of vehicle on which the disc brakes are used, a solution that proves to be optimum based on theoretical simulations can however result unsatisfactory following testing or when used in applications other than those provided for.

Accordingly, those solutions that do not have a strong impact on the whole structure of the brake disc are particularly interesting. One of the possible solutions that have been tested is described in U.S. Pat. No. 6,994,190, which provides for loads or masses to be screwed to the pad plate or fixed thereto by means of rivets or welding.

This solution has proved to be very effective in eliminating the vibrations causing irritating hiss but suffers from several drawbacks during the manufacturing step, in that all the embodiments provided in said document are quite complex and require that much care is taken during the step of fixing the loads to the plates.

SUMMARY OF THE INVENTION

The problem at the heart of the present invention is to provide a pad for disc brakes, which has such structural and functional characteristics as to overcome said drawbacks mentioned with reference to the prior art.

This problem is solved by a pad for disc brakes in accordance with claim 1.

BRIEF DESCRIPTION OF DRAWINGS

Further characteristics and the advantages of the invention will appear from the description set forth below of preferred embodiments thereof, which are merely illustrative and non-limiting, with reference to the annexed figures, in which.

DETAILED DESCRIPTION OF PREFERRED EMBODIMENTS

Figure 5:
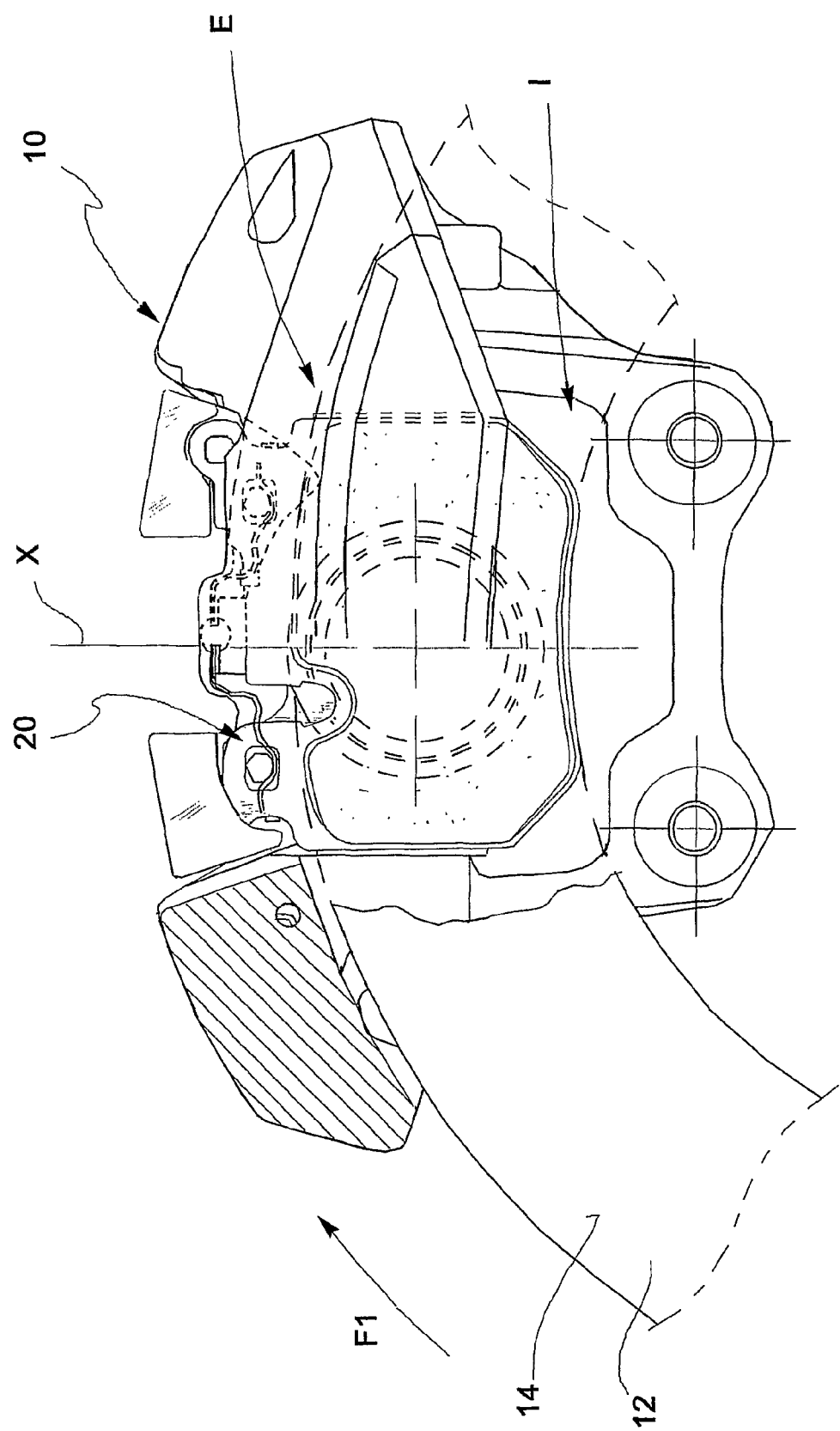
FIG. 5 illustrates a sectional view of a caliper comprising the pad in FIG. 1, when coupled to a vehicle disc.

With reference to FIG. 5, with 10 has been generally designated a caliper of a disc brake that is suitable to act on a braking band 12 of a disc 14. The present invention can be applied to various types of disc brakes, such as the disc brakes with either stationary or floating calipers. The caliper 10 is suitable to be fixed to a spindle of a vehicle suspension, whereas the disc 14 is suitable to be associated with a wheel of the same motor vehicle.

With 20 has been generally designated a disc brake pad, which is suitable to be housed within a respective caliper seat. The pad 20 comprises a plate 22 acting as the support for a friction material layer 24.

Figure 1:
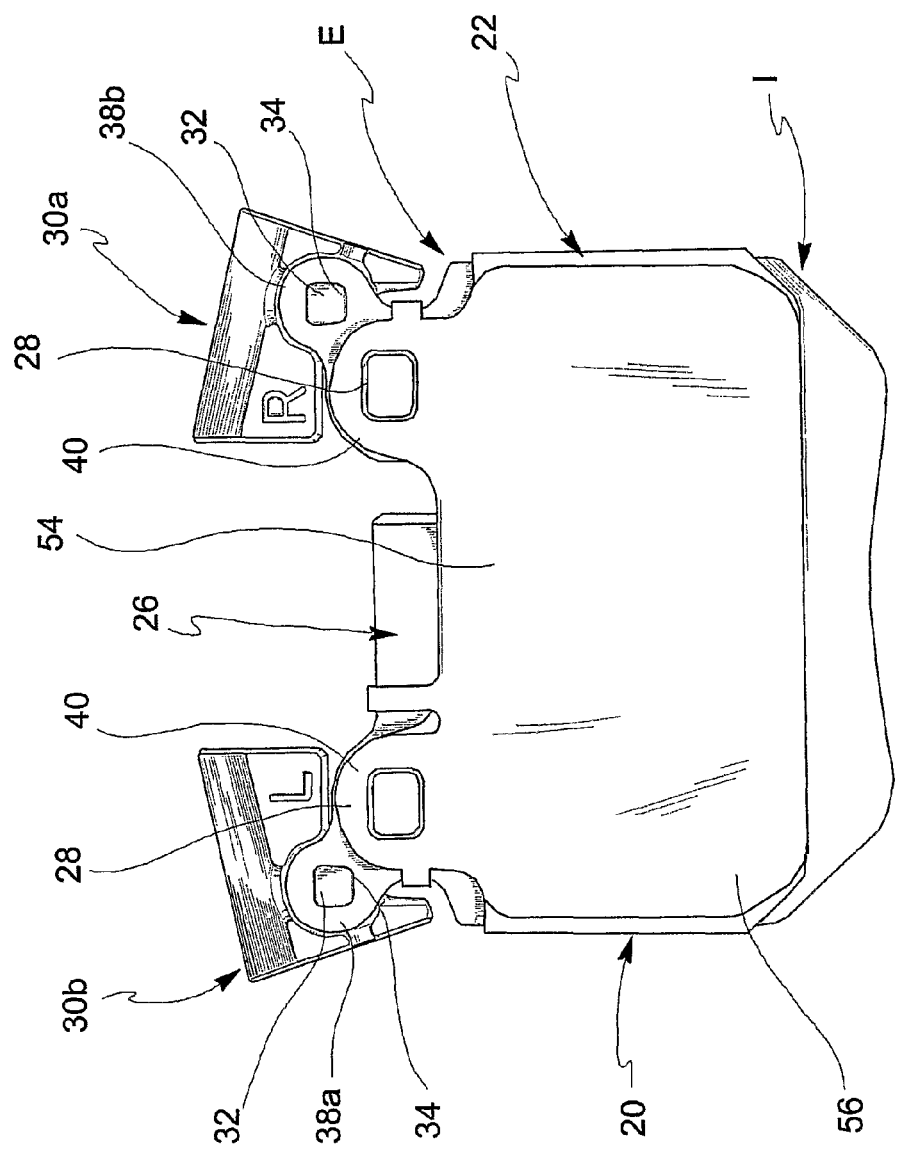
FIG. 1 illustrates a schematic view of a pad for disc brakes according to the present invention.
Figure 2:
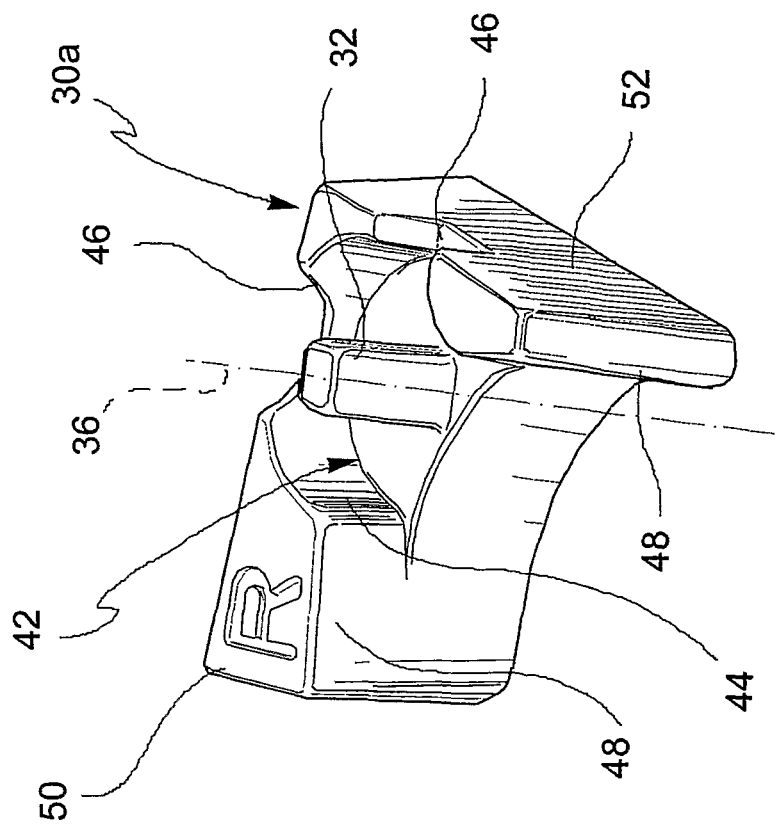
FIG. 2 illustrates a schematic perspective view of an element of the pad in FIG. 1.
Figure 2:
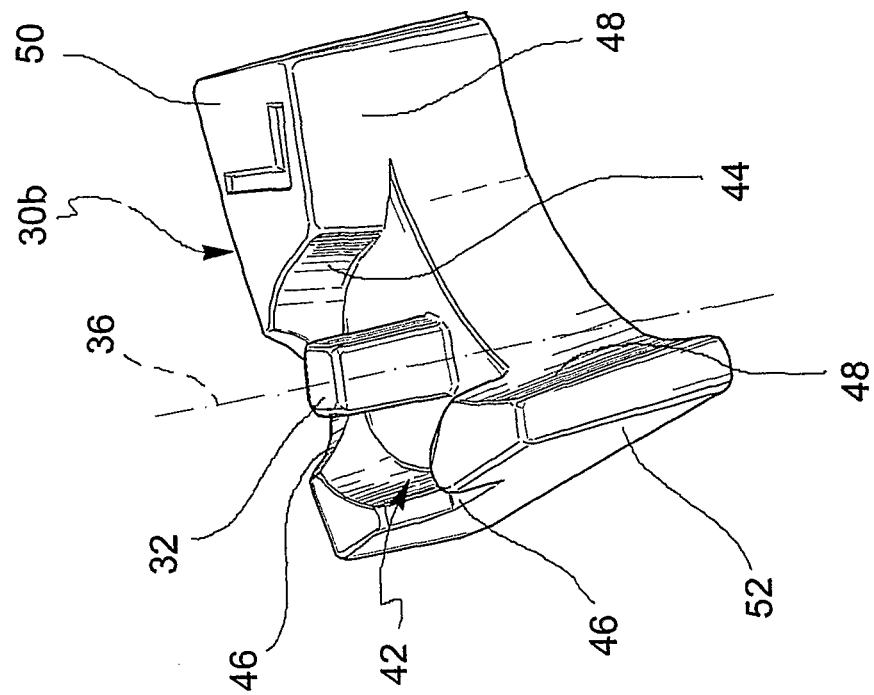
Figure 3:
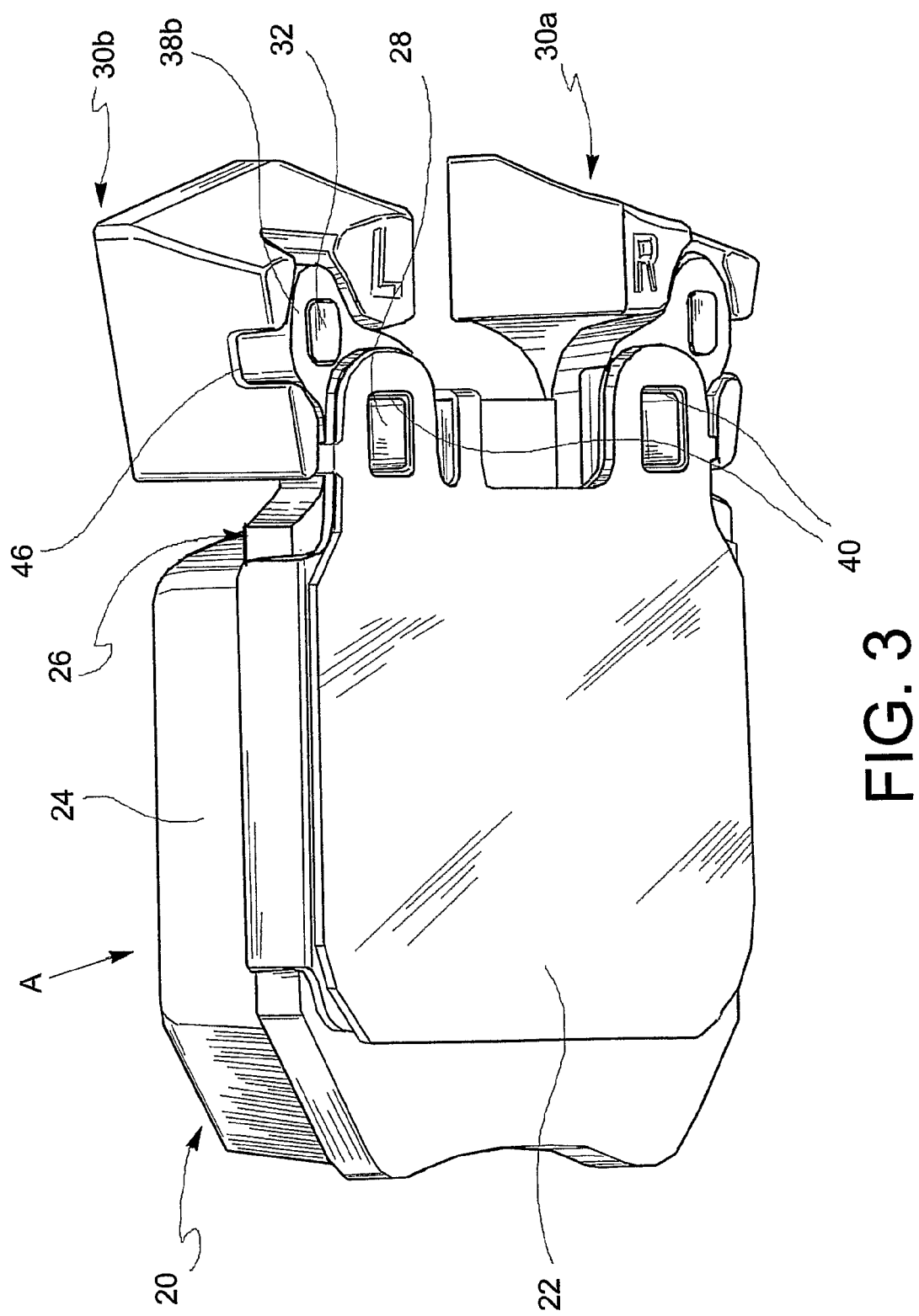
FIG. 3 illustrates a schematic perspective view of the pad in FIG. 1.
Figure 4:
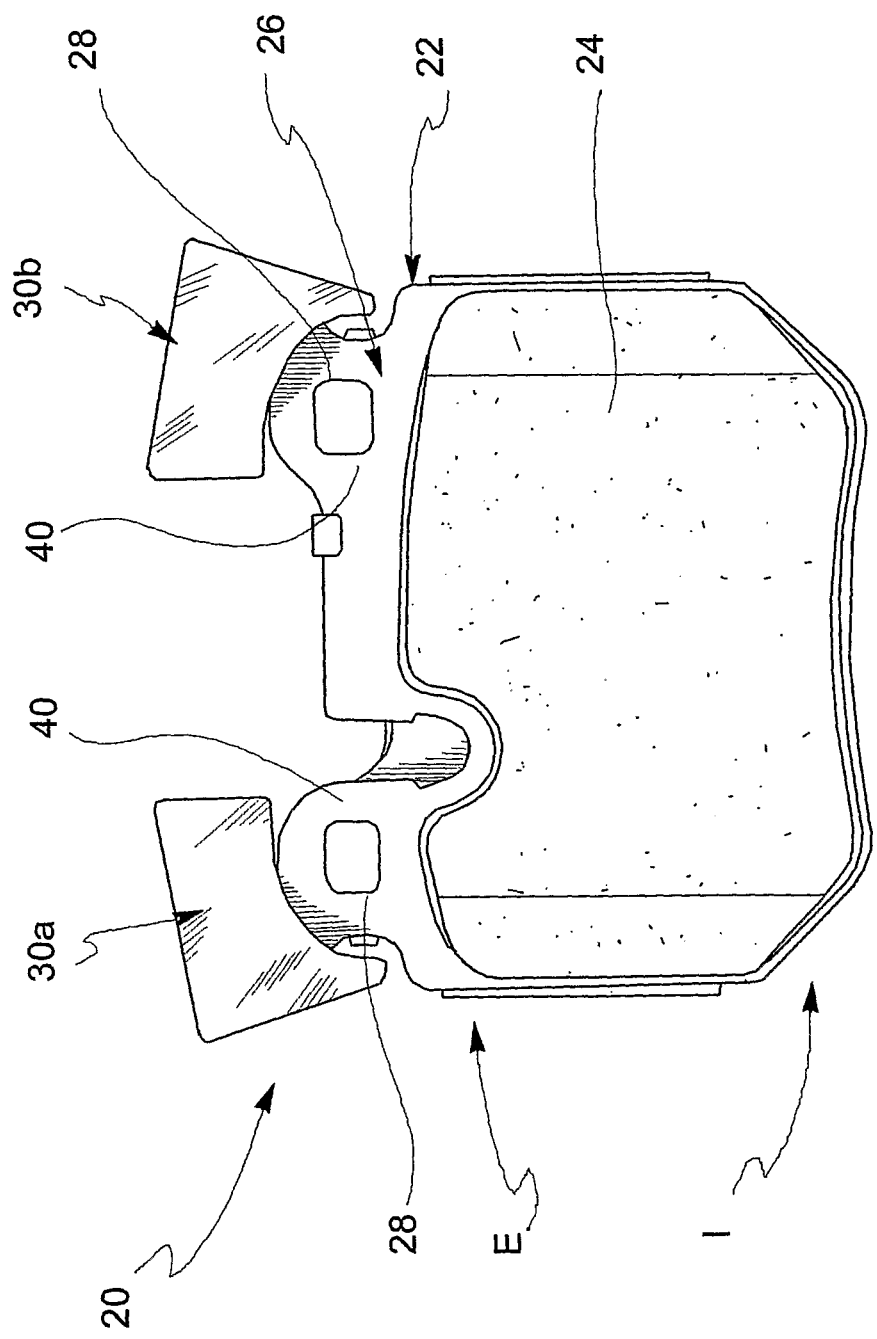
FIG. 4 illustrates a schematic view of the pad in FIG. 1 as seen according to the arrow A in FIG. 3.

With reference to the location of the pad within the caliper mounted to the vehicle (FIGS. 4 and 5), with I has been designated a radially inner portion of the pad, which is the portion proximal to the axis of rotation of the disc, whereas with E has been designated a radially outer portion of the pad, which is the portion distal to the axis of rotation of the disc. Furthermore, considering a rotation of the disc in the direction of arrow F1, the disc portions being on the left and right of line X are defined as the inlet and outlet areas of the disc. In other words, by disc inlet is conventionally designated the side on which a determinate disc radius enters the caliper, with reference to the normal travel direction of the vehicle. Similarly, by disc outlet is conventionally designated the side on which a determinate radius of the disc exits the caliper, with reference to the normal travel direction of the vehicle.

In the embodiment illustrated in the figures, the plate 22 extends past the friction material layer 24 at least at the radially outer portion E. This extension, designated with numeral 26, is suitable to interact with caliper elements and/or resilient elements that are interposed between the caliper and pad in order to hold the pad within the caliper, at least according to a direction radial to the disc. In the particular embodiment illustrated herein, the extension 26 has slots 28 that are suitable to accommodate support pins for the pad.

At least one load or mass is applied to the plate 22 such as at the extension 26 i.e. the radially outer portion E of the plate. In the example illustrated herein, two loads 30a and 30b are provided, which are for example arranged on opposite sides of the plate. In other words, the two loads 30a and 30b are arranged at opposite ends of the plate such that they face, when the plate is mounted to the vehicle, the inlet and outlet areas of the disc, respectively.

The plate and load are advantageously fixed to each other by clinching. Particularly, the load comprises a portion that is suitable to be clinched and form a constraint element for the load on the plate.

In accordance with a possible embodiment, the load comprises at least one projection 32 that is suitable to be clinched to fix the load to the plate. Advantageously, the projection 32 is suitable to be inserted within a hole 34 of the plate, and be subsequently clinched to fix the load to the plate.

In accordance with a possible embodiment, the projection 32 extends along a development axis 36 and has a cross section that is suitable to provide, together with the respective hole 34, a constraint to the rotation against said development axis. For example, the projection 32 has a cross section having a quadrangular shape and the hole 34 has a corresponding shape suitable to receive the projection thus forming a constraint to the rotation of the load about the development axis 36.

In accordance with a possible embodiment, the plate 22 comprises at least one ear to which a respective load is fixed. In the example illustrated herein, two ears 38a and 38b are provided, for example, each supporting a load 30a, 30b. Advantageously, the two ears are arranged on opposite sides of the plate. In other words, the two ears are arranged at opposite ends of the plate, such that they face, when the plate is mounted to the vehicle, the inlet and outlet regions of the disc, respectively.

In accordance with a possible embodiment in which the slots 28 are provided, the two ears 38a and 38b can radially extend to the outside from respective lobed portions 40 encircling these slots, such as for example in the annexed figures.

In accordance with a possible embodiment in which the projection 32 is inserted within the hole 34 and clinched, the respective ear has the above-said hole 34.

Furthermore, it can be advantageously provided that the load has a seat 42 suitable to at least partially encompass the plate, for example the respective ear, when provided. In this case, the seat 42 at least partially encircles the projection 32. In the example illustrated herein, the seat 42 is defined by a peripheral surface 44 having at least one interruption 46.

In accordance with a possible embodiment, the load comprises at least one abutment surface 48 suitable to abut against the edge of the plate thereby defining a constraint to the rotation of the load about the development axis 36 or more generally about an axis of rotation of the disc.

In the example illustrated herein, for example, two abutment surfaces 48 are provided, for example extending at about 90° relative to each other.

In accordance with a possible embodiment, the load is substantially L-shaped defined by a first arm 50 and a second arm 52. In this case, the projection 32, when provided, is arranged for example at the intersection of the two arms forming the L. The seat 42, when provided, may also be arranged, for example, at the intersection of the two arms forming the L.

In accordance with a possible embodiment, the load can be provided by means of casting either of steel or high-tensile cast iron to facilitate the clinching operation.

The loads are suitably arranged on the plate such that they are past the disc outer edge, when said plate is mounted within the caliper. Thereby, any contact is avoided between the loads and the disc even when the friction material layer is worn.

Preferably, in order to prevent that, due to wear of the friction material layer, the loads come in contact with symmetrical loads of a plate that is arranged on the opposite side of the caliper, respectively, the loads project in the direction parallel to the development axis and to the disc by an extent lower than half the thickness of the disc.

In accordance with the embodiment illustrated in the figures, the plate comprises a lamination 54 that is applied to the plate, on the side opposite the friction material layer.

Due to the clinching, particularly of the projection 32, the loads can be structurally coupled to the plate in a substantially rigid manner, i.e. such that the plate forms, together with said loads, substantially an individual rigid body.

The radially outer portion E provided with the loads has a varied (in the instant case, increased) overall mass relative to the starting mass thereof without said loads being applied thereto.

Particularly, it should be noted that the total inertia of the pad provided with the loads is changed relative to the inertia of the pad alone.

The loads are means for changing the mass of one or more plate portions and have such physical and geometrical characteristics and an arrangement on the plate as to obtain an inertia of the pad that substantially avoids those vibrations of the pad occurring during the braking action which are suitable to cause noisiness of the disc brake.

Particularly, the loads are such that the pad takes natural vibration frequencies that are substantially not excitable during the operation of the disc brake.

It should be noted that, when the hiss effect is generated, not only vibrations occur in the braking band and pad but the various components of the brake vibrate at resonance thus affecting each other. In other words, a chain of vibrating elements is formed, which starts from the disc and passes through the pad and caliper until it involves the vehicle suspensions.

Each element composing the disc brake vibrates according to its own natural frequency.

In the disc brake according to the invention, the loads allow changing the inertia moment of the pad as evaluated relative to the axis about which the pad vibrates during the braking operation. As is known, the natural vibration frequency of any body, at which the body vibrates at resonance, is inversely proportional to the inertia moment of the body. By changing the inertia moment of the pad by means of the above-cited loads, the pad natural frequency is allowed to take a value that is substantially non-excitable by the other elements of the disc brake or by the disc during the braking action. In other words, in the disc brake made according to the invention, the chain of vibrating elements that is formed simultaneously with the hiss is interrupted. The pad according to the invention is not capable either of being excited or transmitting the vibration, thereby it is a vibration reducing element.

The pad made in accordance with the invention is such as to have natural vibration frequencies that are not excited by the braking action or which fall outside the frequency range within which the hiss effects normally correspond.

The characteristics of the loads associated with the plate can be experimentally defined relative to a particular application, i.e. for a particular disc brake and a particular vehicle.

It should be understood that variations and/or additions may be provided to what has been described and illustrated above.

For example, the portion suitable to be clinched can be other than the projection 32, either in shape, number or size.

In accordance with an alternative embodiment, the clinching can occur at an edge of the plate, such as not providing holes 34.

In accordance with an alternative embodiment, the clinched portion can be a part of the plate, for example duly made of a material suitable to be clinched.

The loads can have size and shape other than what has been described and illustrated herein.

In an alternative embodiment of the pad, an individual slot can be provided to house a support pin for the pad. In this case, the two loads can be however arranged on opposite sides of the pad, for example using ears extending from the plate. Or, the pad can be supported in alternative manners, without using slots or support pins.

To the preferred embodiment of the pad as described above, those skilled in the art, aiming at meeting contingent and specific requirements, may carry out a number of modifications, adaptations and replacements of elements with functionally equivalent ones, without however departing from the scope of the claims below.

The invention claimed is:

1. A pad for disc brakes comprising a friction material layer and a plate acting as the support for said friction material layer, wherein
   said plate extends past the friction material layer at least at a radially outer portion of the pad,
   two loads are applied to opposite ends of the plate and fixed thereto by means of clinching, said loads changing the mass of the pad such as to obtain an inertia of the pad which substantially avoids vibrations of the pad during braking action, which otherwise would cause noisiness of the disc brake,
   each said load comprises at least one abutment surface abutting the edge of the plate thereby preventing rotation of the load about an axis of rotation of the disc,
   each said load comprises a projection which may be clinched,
   said plate has holes therein for receiving said projections,
   each of said projections is inserted through a respective one of said holes and clinched to fix the respective load to the plate, and
   each said load has substantially an L-shape.

2. The pad for disc brakes according to claim 1, wherein said projection extends along a development axis and has a cross section suitable to provide, together with the respective hole, a constraint to the rotation of the load about said development axis.

3. The pad for disc brakes according to claim 2, wherein said projection has a cross section having a quadrangular shape and said hole has a corresponding shape suitable to receive the projection thereby being a constraint to the rotation of the load about the development axis.

4. The pad for disc brakes according to claim 1, wherein
   said plate comprises at least one ear to which a respective load is fixed,
   said plate has at least one slot,
   said ear extends outward from a respective lobed portion encircling said slot, and
   each said ear has formed therein one of said holes for receiving a respective one of said projections.

5. The pad for disc brakes according to claim 1, wherein
   said load has a seat which at least partially encompasses the plate,
   said seat is defined by a peripheral surface, and
   said peripheral surface has at least one interruption.

6. The pad for disc brakes according to claim 5, wherein
   said plate comprises at least one ear to which a respective load is fixed,
   said seat at least partially encompasses said ear,
   said seat at least partially encircles the projection.

7. The pad for disc brakes according to claim 6, wherein each said projection extends along an development axis and has a cross section that provides, together with a respective hole, a constraint to the rotation about said development axis.

8. The pad for disc brakes according to claim 7, wherein each said projection has a cross section having a quadrangular shape and each said hole has a corresponding shape that is suitable to receive the projection thereby being a constraint to the rotation of the load about the development axis.

9. The pad for disc brakes according to claim 1, wherein said load comprises two abutment surfaces extending at about 90° relative to each other.

10. The pad for disc brakes according to claim 1, wherein each said projection is arranged at the intersection of two arms forming the L-shape.

11. The pad for disc brakes according to claim 10, wherein said projection extends along a development axis and has a cross section that provides, together with the respective hole, a constraint to the rotation about said development axis.

12. The pad for disc brakes according to claim 11, wherein said projection has a cross section having a quadrangular shape and said hole has a corresponding shape suitable to receive the projection thereby being a constraint to rotation of the load about the development axis.

13. The pad for disc brakes according to claim 1, wherein said load has a seat that at least partially encompasses the plate and wherein said seat is arranged at the intersection of two arms forming the L-shape.

14. The pad for disc brakes according to claim 1, wherein said load is made of steel casting or high-tensile cast iron.

15. The pad for disc brakes according to claim 1, wherein said plate has two ears, each supporting a load, said ears being arranged on opposite sides of the plate relative to a median radius of the pad.

16. The pad for disc brakes according to claim 1, wherein said loads are arranged on the plate such that they are located past the outer edge of a brake disc, when said plate is mounted within a caliper.

17. The pad for disc brakes according to claim 16, wherein said loads project in a direction parallel to an axis of rotation of the disc of the disc brake and towards the disc by less than half the thickness of the disc.

18. The pad for disc brakes according claim 1, wherein said load is applied to the plate at an extension of the plate extending past the friction material layer.

* * * * *